US008295595B2

(12) United States Patent
Matsushita et al.

(10) Patent No.: US 8,295,595 B2
(45) Date of Patent: Oct. 23, 2012

(54) GENERATING FULL COLOR IMAGES BY DEMOSAICING NOISE REMOVED PIXELS FROM IMAGES

(75) Inventors: Nobuyuki Matsushita, Kanagawa (JP); Ken Nakajima, Tokyo (JP); Mikiko Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 12/279,190

(22) PCT Filed: Sep. 20, 2007

(86) PCT No.: PCT/JP2007/068898
§ 371 (c)(1),
(2), (4) Date: Oct. 30, 2008

(87) PCT Pub. No.: WO2008/072406
PCT Pub. Date: Jun. 19, 2008

(65) Prior Publication Data
US 2009/0052797 A1 Feb. 26, 2009

(30) Foreign Application Priority Data

Dec. 15, 2006 (JP) .................. 2006-338233

(51) Int. Cl.
*G06K 9/00* (2006.01)
*G06K 9/40* (2006.01)
*H04N 9/64* (2006.01)
(52) U.S. Cl. .......... 382/167; 382/254; 348/242
(58) Field of Classification Search .......... 382/167
See application file for complete search history.

(56) References Cited

U.S. PATENT DOCUMENTS

| 4,642,678 | A  | * | 2/1987  | Cok ................. 348/242 |
| 4,724,395 | A  |   | 2/1988  | Freeman |
| 6,944,337 | B2 | * | 9/2005  | Jaspers .................. 382/167 |
| 6,980,326 | B2 | * | 12/2005 | Tsuchiya et al. ............ 358/1.9 |
| 7,082,218 | B2 | * | 7/2006  | Pollard et al. .............. 382/167 |
| 2001/0036231 | A1 | * | 11/2001 | Easwar et al. .......... 375/240.19 |
| 2002/0196355 | A1 | * | 12/2002 | Hiroshige et al. .......... 348/252 |
| 2003/0020728 | A1 |   | 1/2003  | Saquib et al. |
| 2004/0246350 | A1 | * | 12/2004 | Sakamoto .............. 348/241 |

(Continued)

FOREIGN PATENT DOCUMENTS

JP 2002 503894 2/2002

(Continued)

OTHER PUBLICATIONS

Office Action issued Sep. 13, 2010 in Chinese Application No. 200780005498.9.

(Continued)

*Primary Examiner* — David Zarka
(74) *Attorney, Agent, or Firm* — Oblon, Spivak, McClelland, Maier & Neustadt, L.L.P.

(57) ABSTRACT

A method and apparatus to remove color noise included in raw data while effectively preventing image quality degradation. For interest pixels serially set onto a mosaic image formed of raw data, conversion is executed into a pixel value for noise removal based on a processing reference pixel value having a unified color signal component in each interest pixel, noise is removed from the pixel value for noise removal, and the pixel value for noise removal with noise removed is converted into the source pixel value, whereby only color noise can be removed without affecting a luminance signal.

16 Claims, 9 Drawing Sheets

U.S. PATENT DOCUMENTS

| | | | |
|---|---|---|---|
| 2005/0073596 A1* | 4/2005 | Takahashi | 348/241 |
| 2005/0201616 A1* | 9/2005 | Malvar et al. | 382/167 |
| 2005/0220337 A1* | 10/2005 | Arazaki | 382/162 |
| 2006/0038899 A1* | 2/2006 | Tamaru et al. | 348/241 |
| 2006/0232690 A1* | 10/2006 | Tamura et al. | 348/242 |
| 2006/0245660 A1* | 11/2006 | Hung | 382/254 |
| 2007/0153335 A1* | 7/2007 | Hosaka | 358/463 |

FOREIGN PATENT DOCUMENTS

| | | |
|---|---|---|
| JP | 2004 221838 | 8/2004 |
| JP | 2005 159916 | 6/2005 |
| JP | 2005 311455 | 11/2005 |
| JP | 2006 60661 | 3/2006 |

OTHER PUBLICATIONS

Rajeev Ramanath, et al., "Demosaicking methods for Bayer color arrays", Journal of Electronic Imaging, vol. 11, No. 3, XP-001122626, Jul. 1, 2002, pp. 306-315.

* cited by examiner

FIG. 5

| Gr0 | R0  | Gr1 | R1  |
|-----|-----|-----|-----|
| B0  | Gb0 | B1  | Gb1 |
| Gr2 | Cr2 | Gr3 | R3  |
| B2  | Gb2 | B3  | Gb3 |

FIG. 6

| Gr0 | R0  | Gr1 | R1  |
|-----|-----|-----|-----|
| B0  | Gb0 | Cb1 | Gb1 |
| Gr2 | Cr2 | Gr3 | R3  |
| B2  | Gb2 | B3  | Gb3 |

FIG. 7

| Gr0 | Cr0 | Gr1 | Cr1 |
|-----|-----|-----|-----|
| Cb0 | Gb0 | Cb1 | Gb1 |
| Gr2 | Cr2 | Gr3 | Cr3 |
| Cb2 | Gb2 | Cb3 | Gb3 |

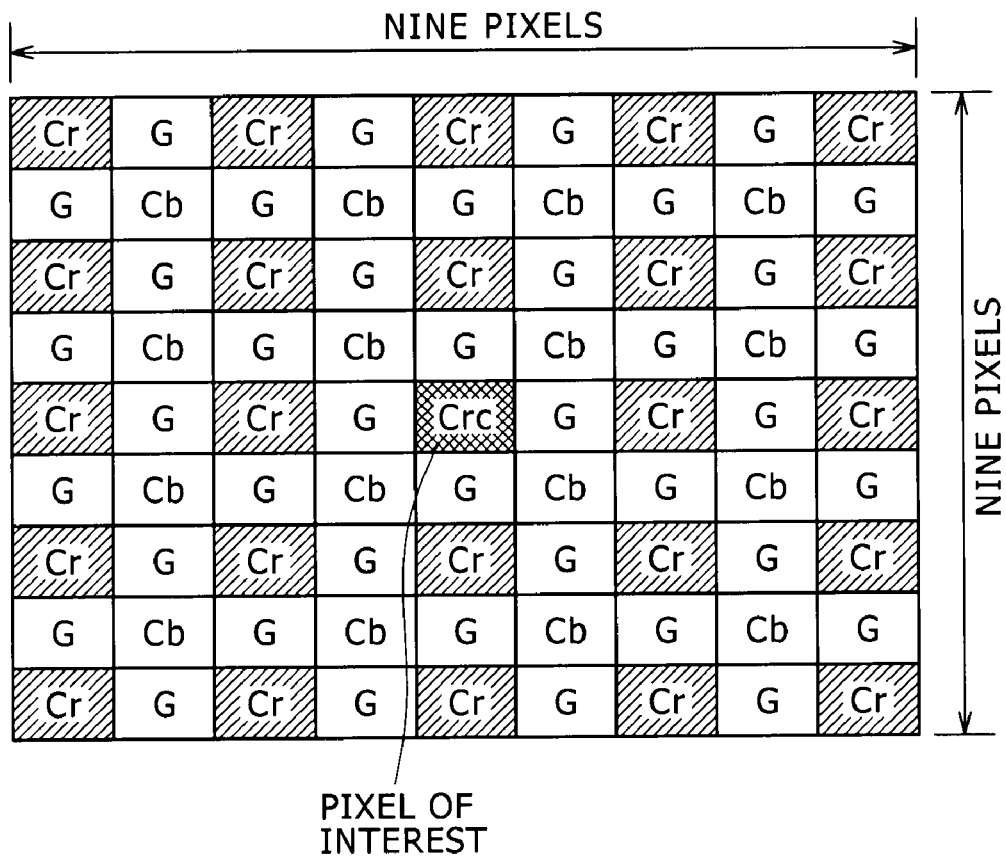

FIG.10

| Gr0 | Cr0 | Gr1 | Cr1 |
|---|---|---|---|
| Cb0 | Gb0 | Cb1 | Gb1 |
| Gr2 | R2 | Gr3 | Cr3 |
| Cb2 | Gb2 | Cb3 | Gb3 |

FIG.11

| Gr0 | Cr0 | Gr1 | Cr1 |
|---|---|---|---|
| Cb0 | Gb0 | B1 | Gb1 |
| Gr2 | R2 | Gr3 | Cr3 |
| Cb2 | Gb2 | Cb3 | Gb3 |

FIG.12

| Gr0 | R0 | Gr1 | R1 |
|---|---|---|---|
| B0 | Gb0 | B1 | Gb1 |
| Gr2 | R2 | Gr3 | R3 |
| B2 | Gb2 | B3 | Gb3 |

GENERATING FULL COLOR IMAGES BY DEMOSAICING NOISE REMOVED PIXELS FROM IMAGES

BACKGROUND OF THE INVENTION

1. Technical Field

The present invention relates to an image capture apparatus, an image processing apparatus, an image processing method, a program for the image processing method, and a recording medium that records therein the program for the image processing method, which are adaptable to, for example, digital still cameras. According to the invention, a pixel value of each interest pixel is converted into a pixel value for noise removal based on a processing reference pixel value having a unified color signal component in each interest pixel to remove noise therefrom, and then the pixel value is reversely converted into the original pixel value to effectively prevent image quality degradation, whereby color noise included in raw data can be removed.

2. Background Art

In conventional digital still cameras, after raw data serially acquired in a pixel array of an imaging device is demosaiced and a full color image is generated thereby, the data is converted to image data of a luminance signal and a color difference signal and recorded on a recording medium. It is known that noise of such a color image is classified into luminance noise, which is the noise of the luminance signal component, and color noise, which is the noise of the color signal component exclusive of the luminance signal component. And an image quality can be significantly improved by removing the color noise.

In regard to digital still cameras, in Japanese Unexamined Patent Application Publication No. 2005-311455, a method is proposed in which a peripheral pixel appropriate for a noise reduction process is selected, and the noise reduction process is executed by use of the selected peripheral pixel, thereby to efficiently remove the noise in the stage of the raw data.

Further, in Japanese Unexamined Patent Application Publication No. 2004-221838, a method of accurately regenerating an edge in the manner that, in a demosaicing process or the like, an interpolation calculation process of a pixel value of an interest pixel is executed by use of pixel values in a predetermined range present along the extensional direction of the edge.

By the way, when color noise is removed in the raw data stage, there is a problem that even the luminance signal component is affected, and hence even the luminance value of each color signal is changed. As a consequence, a case can occur in which an edge portion and like are displayed in an incorrect color, thereby leading to significant deterioration in image quality.

As one method for solving the problem, it can be considered that noise is removed in the stage of the luminance signal and the color difference signal. According to the method, it can be considered that the color noise can be removed without affecting the luminance signal.

However, in this method, since the demosaicing process is executed in the state where the data is contaminated with noise, a problem takes place in that the demosaicing process is affected when there is a significant amount of noise contamination. More specifically, in the case where, for example, an edge is regenerated by the demosaicing process or the like in accordance with the method disclosed in Japanese Unexamined Patent Application Publication No. 2004-221838, a case can occur in which the edge is regenerated incorrectly due to noise, the edge portion and the like are displayed in the incorrect color and color noise rather occurs to the extent of significantly degrading image quality. Further, a problem can occur in that the noise characteristics are intricately changed through the series of processes from the raw data stage in the stages of the luminance signal and the color difference signal, consequently making it impossible to remove the color noise. Further, there is a case where the configuration of a noise removing circuit cannot be provided due to configurational restrictions of a signal processing circuit and the like. In this case, there is a problem in that the method cannot be adapted.

DISCLOSURE OF THE INVENTION

The present invention is made by taking the above into consideration, and it is intended to propose an image capture apparatus, an image processing apparatus, an image processing method, a program for the image processing method, and a recording medium recording therein the program for the image processing method that are capable of removing color noise included in raw data while effectively preventing image quality degradation.

The present invention for achieving the object is adapted to an image capture apparatus, wherein the apparatus is configured to include an image capture section that outputs raw data; a converting section that serially sets each interest pixel onto a mosaic image formed of the raw data and that converts a pixel value of each interest pixel into a pixel value for noise removal based on a processing reference pixel value having a unified color signal component in each interest pixel; a noise removing section that removes noise from the pixel value for noise removal; a reversely converting section that converts the pixel value for noise removal with noise removed in the noise removing section into a source pixel value by executing an inverse process relative to the process performed in the converting section; and a demosaicing section that generates full color image data by executing a demosaicing process of the mosaic image formed from the image values processed in the reversely converting section.

Further, present invention is adapted to an image processing apparatus that suppresses noise of raw data serially acquired in a pixel array of an imaging device, wherein the apparatus includes a converting section that serially sets each interest pixel onto a mosaic image formed of the raw data and that converts a pixel value of each interest pixel into a pixel value for noise removal based on a processing reference pixel value having a unified color signal component in each interest pixel; a noise removing section that removes noise from the pixel value for noise removal; and a reversely converting section that converts the pixel value for noise removal with noise removed in the noise removing section into the source pixel value by executing an inverse process relative to the process performed in the converting section.

Further, the present invention is adapted to an image processing method that suppresses noise of raw data serially acquired in a pixel array of an imaging device, wherein the method includes a converting step that serially sets each interest pixel onto a mosaic image formed of the raw data and that converts a pixel value of each interest pixel into a pixel value for noise removal based on a processing reference pixel value having a unified color signal component in each interest pixel; a noise removing step that removes noise from the pixel value for noise removal; and a reversely converting step that converts the pixel value for noise removal with noise removed in the noise removing step into the source pixel value by executing an inverse process relative to the process performed in the converting step.

Also, the present invention is adapted to a program for an image processing method that suppresses noise of raw data serially acquired in a pixel array of an imaging device, wherein the program includes a converting step that serially sets each interest pixel onto a mosaic image formed of the raw data and that converts a pixel value of the interest pixel into a pixel value for noise removal based on a processing reference pixel value having a unified color signal component in each interest pixel; a noise removing step that removes noise from the pixel value for noise removal; and a reversely converting step that converts the pixel value for noise removal with noise removed in the noise removing step into the source pixel value by executing an inverse process relative to the process performed in the converting step.

Further, the present invention is adapted to a recording medium recording thereon a program for executing an image processing method that suppresses noise of raw data serially acquired in a pixel array of an imaging device, wherein the program includes a converting step that serially sets each interest pixel onto a mosaic image formed of the raw data and that converts a pixel value of the interest pixel into a pixel value for noise removal based on a processing reference pixel value having a unified color signal component in each interest pixel; a noise removing step that removes noise from the pixel value for noise removal; and a reversely converting step that converts the pixel value for noise removal with noise removed in the noise removing step into the source pixel value by executing an inverse process relative to the process performed in the converting step.

According to the configuration of the present invention, noise is removed in the pixel value for noise removal based on the processing reference pixel value having the unified color signal component in the each interest pixel, whereby color noise can be suppressed by sufficiently reducing the influence on the luminance signal. Consequently, the color noise included in the raw data can be removed while effectively preventing image quality degradation.

According to the present invention, color noise included in the raw data can be removed while effectively preventing image quality degradation.

BRIEF DESCRIPTION OF DRAWINGS

FIG. 5 is a plan view for continuation of the description related to FIG. 4.

FIG. 6 is a plan view related to a description of processing of blue pixels of the simple demosaicing section 15 of the optical correcting section shown in FIG. 2.

FIG. 7 is a plan view for continuation of the description related to FIG. 6.

FIG. 8 is a plan view related to a description of processing a noise removing section of the optical correcting section shown in FIG. 2.

FIG. 9 is a plan view related to a description of processing red pixels of the simple demosaicing section 18 of the optical correcting section shown on FIG. 2.

FIG. 10 is a plan view related to a description of blue pixels of the simple demosaicing section 18 of the optical correcting section shown on FIG. 2.

FIG. 11 is a plan view for continuation of FIG. 10.

FIG. 2 is a plan view for continuation of FIG. 11.

BEST MODE FOR CARRYING OUT THE INVENTION

Embodiments of the present invention will be described in detail below by appropriately referring to the accompanying drawings.

(1) Configuration of First Embodiment

Figure 1:
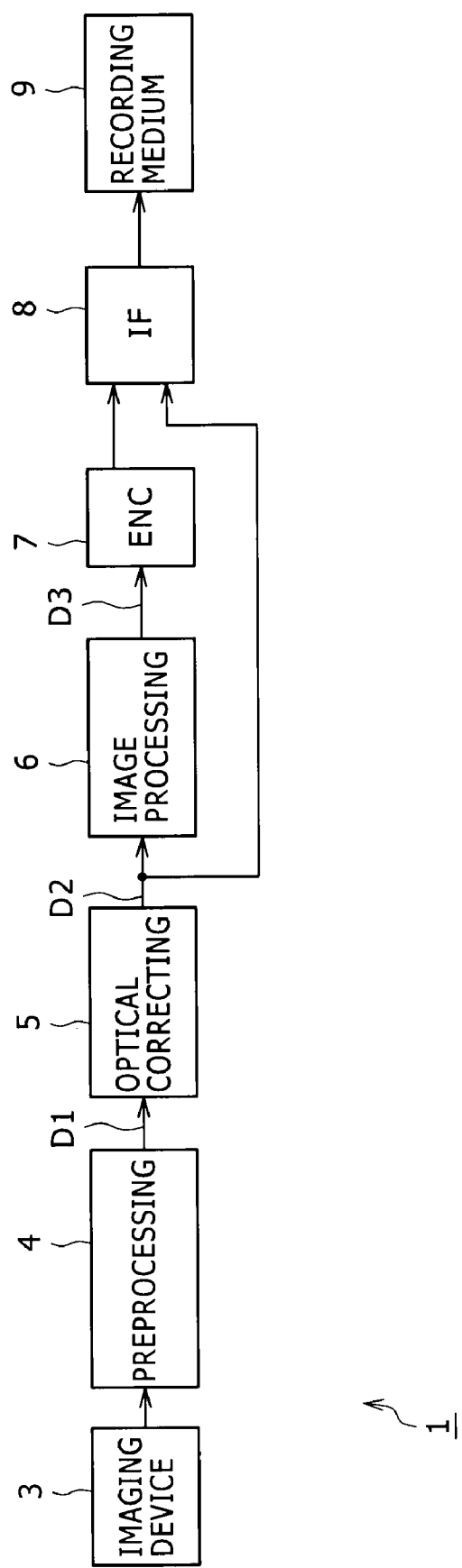
FIG. 1 is a block diagram showing a digital still camera of a first embodiment of the present invention.

FIG. 1 is a block diagram showing a digital still camera of an embodiment of the present invention. In the digital still camera 1, an imaging device 3 is configured to include a CCD (Charge Coupled Device) solid state imaging device, a CMOS (Complementary Metal-Oxide Semiconductor) solid state imaging device, and the like. The imaging device 3 performs photoelectric conversion of an optical image formed on an image capture surface through a lens unit (not shown), and sequentially outputs pixel values of red, blue, and green pixels in the sequential order corresponding to the Bayer array.

A preprocessing section 4 executes a correlated double sampling process, an automatic gain adjustment process, and an analog-digital conversion process of an output signal of the imaging device 3, thereby outputting raw data D1.

An optical correcting section 5 executes a defect correction process and white balance adjustment process of the raw data D1 output from the preprocessing section 4, thereby outputting raw data D2. Further, in the case where the raw data D1 of a sufficient S/N ratio cannot be acquired when, for example, performing image capture in a charge storage time period shorter than a predetermined time period, or where a user commands color noise to be removed, the optical correcting section 5 executes the color noise removing process and then outputs raw data D2.

An image processing section 6 executes, for example, a demosaicing process, resolution conversion process, gamma correction process, and image quality correction process of the raw data D2, thereby converting the raw data D2 to image data D3 of a luminance signal and a color difference signal and outputting the image data D3. The digital still camera 1 displays the image data D3, which has been processed in the image processing section 6, on a display device (not shown), thereby displaying a monitor image of the image capture result.

An encoder 7 (ENC) executes data compression of the image data D3 output from the image processing section 6 by using a still image coding scheme conforming to, for example, the JPEG (Joint Photographic Coding Experts Group) standards, thereby outputting the compressed image data D3.

An interface 8 (IF) records onto a recording medium 9, either an output data of the encoder 7 or the raw data D2 output from the optical correcting section 5. The recording medium 9 is a memory card in the present embodiment and records various data output from the interface 8. However, not only such a memory card, any one of various recording media, such as an optical disk and magnetic disk, can be widely adapted for the recording medium 9.

Figure 2:
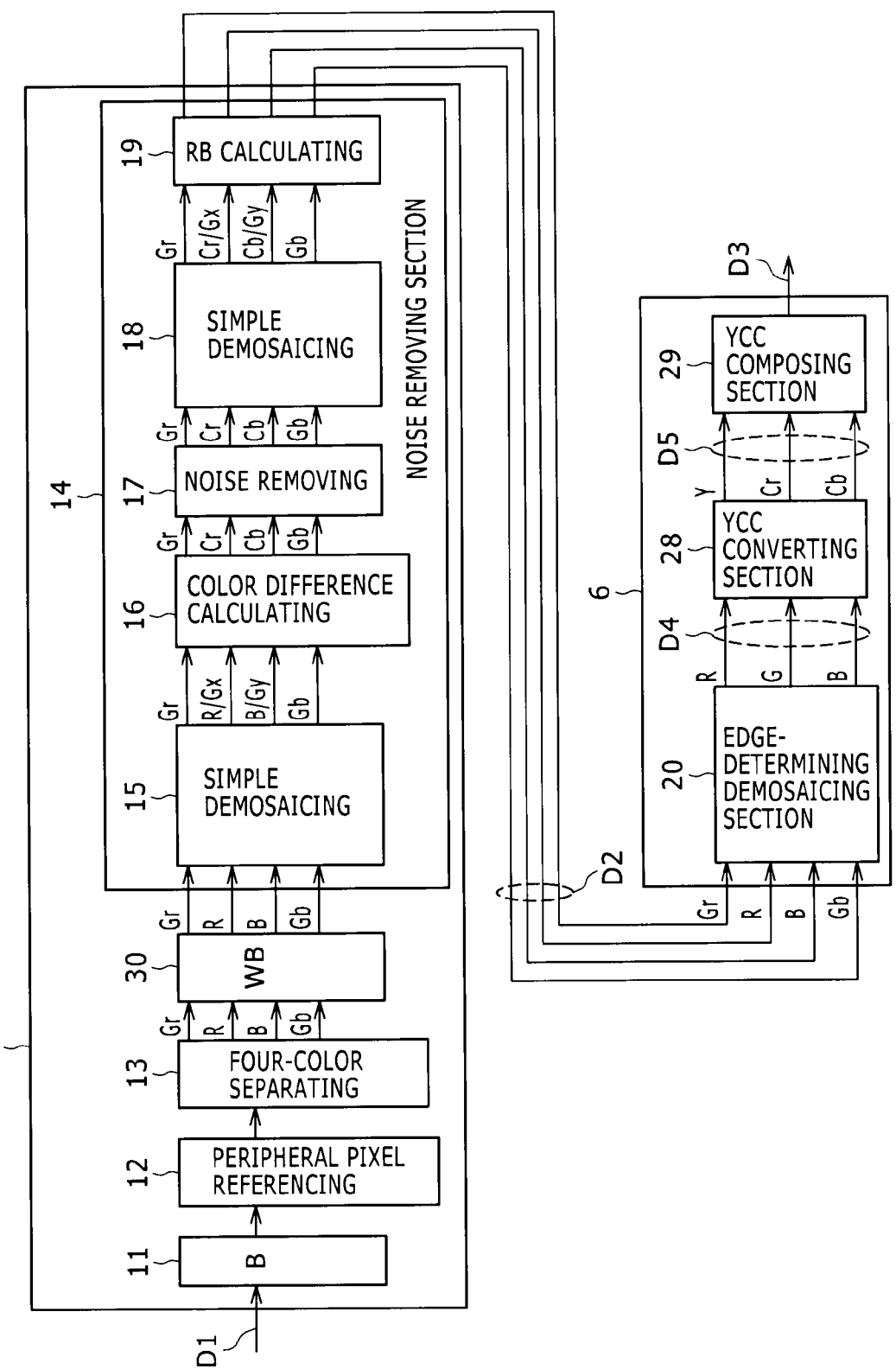
FIG. 2 is block diagrams showing configurations in an optical correcting section and an image processor section of the digital still camera shown in FIG. 1.
Figure 3:
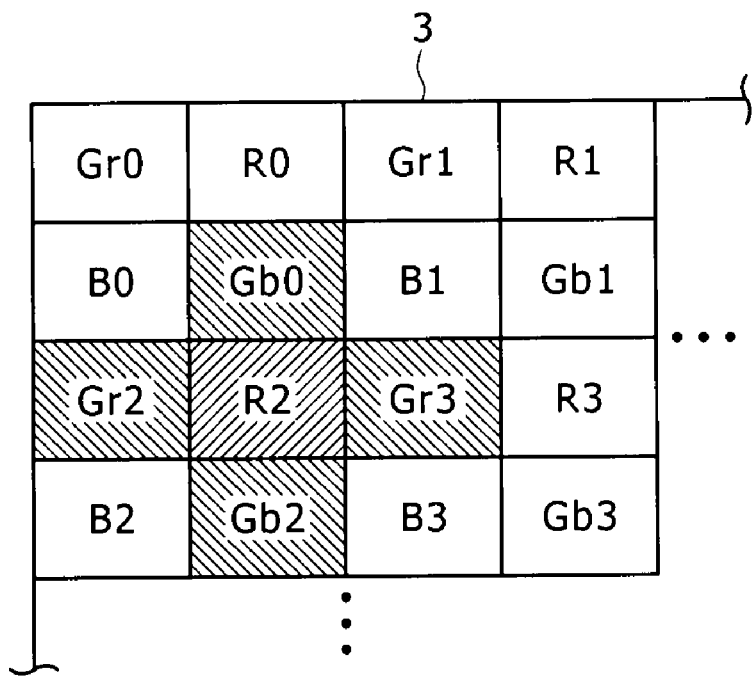
FIG. 3 is a plan view showing an array of pixels of an imaging device of the digital still camera shown in FIG. 1.

FIG. 2 is block diagrams showing configurations in the optical correcting section 5 and the image processing section 6 for execution of color noise removal. Referring to FIG. 2, the optical correcting section 5 inputs raw data D1 into a buffer (B) 11. Here, the raw data D1 is image data of pixel values of respective pixels sequentially and consecutively arranged in the order of a Bayer array of the imaging device 3. FIG. 3 is a plan view showing the Bayer array of the imaging device 3. The imaging device 3 is formed in the manner that green and red pixels Gr and R are alternately arranged on an odd number line and blue and green pixels B and Gb are alternately arranged on a subsequent even number line, and a block of two pixels×two pixels is repeatedly formed. Further, hereinbelow, two green pixels of one block are respectively represented by characters Gr and Gb. As such, the raw data D1 is stored into the buffer 11 correspondingly to the Bayer array in the manner that green and red pixel values alternately repeated along odd number lines are stored into the buffer 11, and blue and green pixel values alternately repeated on the even number lines are stored into the buffer 11. Further, hereinbelow, green, red, and blue pixel values and image data are appropriately represented by using the characters Gr, Gb, R, and B representing corresponding pixels.

A peripheral pixel referencing section 12 is configured to include a buffer having a fixed area, and sequentially reads out image data Gr, Gb, R, and B in units of a predetermined size from raw data D1 stored in the buffer 11 and outputs read out image data Gr, Gb, R, and B. The peripheral pixel referencing section 12 sequentially sets pixels of interest on a mosaic image of the raw data D1 in accordance with the process of the image data Gr, Gb, R, and B, and sequentially outputs an image value of the interest pixel and pixel values of peripheral pixels.

A four-color separating section 13 separates the image data Gr, Gb, R, and B, which are serially output from the peripheral pixel referencing section 12, into four types of image data in the arrangement of the blocks of two pixels×two pixels described in conjunction of FIG. 3, and outputs the four types of image data Gr, Gb, R, and B.

A white balancing section 30 (WB) performs white balance adjustment of the image data Gr, Gb, R, and B output from the four-color separating section 13, and outputs the adjusted image data Gr, Gb, R, and B. A noise removing section 14 removes color noise from the image data Gr, Gb, R, and B output from the white balancing section 30, and outputs the resultant image data Gr, Gb, R, and B. More specifically, in the noise removing section 14, a simple demosaicing section 15 performs a simple calculation process relative to a demosaicing process performed in the image processing section 6, thereby performing a demosaicing process of the image data Gr, Gb, R, and B output from the four-color separating section 13. More specifically, the noise removing section 14 generates, for every interest pixels, a processing reference pixel value having a unified color signal component in each interest pixel from neighbor pixels around the interest pixel.

In the present embodiment, green pixel values are adopted for processing reference pixel values, so that the simple demosaicing section 15 generates processing reference pixel values only for red and blue pixels R and B. More specifically, the simple demosaicing section 15 performs an interpolation calculation process using the pixel values of the adjacent green pixels Gr and Gb, thereby calculating pixel values of green pixels in spatial positions of respective red and blue pixels R and B and then generating processing reference pixel values for the red and blue pixels R and B.

Figure 4:
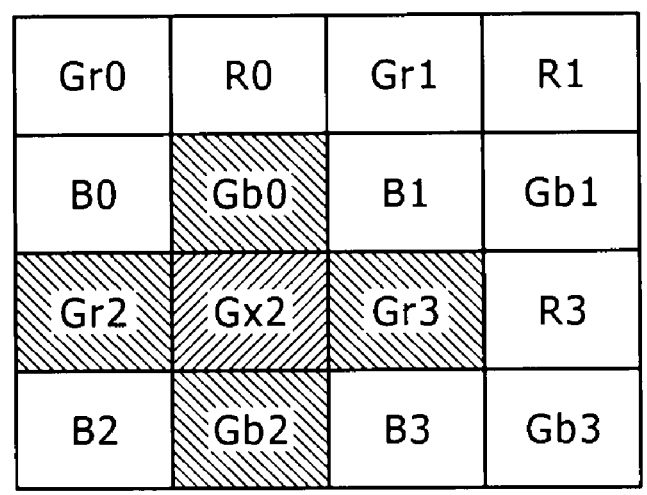
FIG. 4 is a plan view related to a description of processing of a simple demosaicing section 15 of the optical correcting section shown in FIG. 2.

More specifically, as shown on FIGS. 3 and 4, in the case where the interest pixel is a red pixel R2, the noise removing section 14 averages pixel values of green pixels Gb0, Gr2, Gr3, and Gb2 adjacent to the red pixel R2. Thereby, the noise removing section 14 obtains a green pixel value Gx2 in the spatial position of the interest pixel R2. The noise removing section 14 sets the calculated green pixel values Gx2 to the processing reference pixel value of the red pixel R2. Also, for the blue pixel B, similarly, the noise removing section 14 averages pixel values of adjacent green pixels, and calculates a pixel value of a green pixel in the spatial position of the blue pixel B1 and sets it to a processing reference pixel value Gy. The simple demosaicing section 15 outputs both the green pixel values Gx and Gy in the positions of the calculated red and blue pixels R and B together with the pixel values Gr, Gb, R, and B output from the four-color separating section 13.

By using the pixel values Gr, Gb, R, B, Gx, and Gy, which have been output from the simple demosaicing section 15, a color difference calculating section 16 generates pixel values for noise removal indicative of pixel values of red and blue pixels on the basis of the processing reference pixel values. More specifically, in the present embodiment, the color difference calculating section 16 calculates color differences from the pixel values Gr, Gb, R, B, Gx, and Gy, which are output from the simple demosaicing section 15. In the present embodiment, the pixel values of the calculated color differences are adapted to the pixel values for noise removal. The color difference pixel value calculated on the basis of the processing reference pixel value is indicative of not only the color difference pixel value in the luminance signal and the color difference signal, but also, in a broad sense, the hue of the interest pixel by comparison to a color signal component contained in the processing reference.

Here, in the present embodiment, green pixel values are adapted to the processing reference pixel values, so that the color difference calculating section 16 calculates color differences to the green pixel value only for the pixel values of the red and blue pixels R and B. More specifically, as shown in FIG. 5 by comparison to FIG. 3 and FIG. 4, a color difference Cr2 of the red pixel R2 is set in the following manner. The processing reference pixel value Gx2, which has been calculated in the position of the red pixel R2, is subtracted from the pixel value R2 of the red pixel R2, and a resultant subtraction value (R2−Gx2) is set to the color difference of the red pixel R2. Also, similarly, as shown in FIG. 6, a color difference Cb1 of the blue pixel B1 is set as follows. The processing reference pixel value Gy2, which has been calculated in the position of the blue pixel B1, is subtracted from the pixel value of the blue pixel B1, and a resultant subtraction value (B1−Gy1) is set to the color difference Cb1 of the blue pixel B1.

The color difference calculating section 16 executes the color difference calculation of all the red and blue pixels R and B. As a consequence, as shown in FIG. 7 by comparison to FIG. 3, the pixel values of the red and blue pixels R and B are converted to pixel values Cr and Cb of the color differences, which are respectively, calculated on the basis of the pixel values of green pixels.

A noise removing section 17 executes the noise removing process for every red and blue color differences calculated in the color difference calculating section 16 and performs outputting. More specifically, in the present embodiment, as shown in FIG. 8, the noise removing section 17 executes the noise removing process by using a nine-by-nine-pixel ε-filter. Here, for example, in the event of noise removal of a color difference Crc of a red pixel, the nine-by-nine pixel region centering on the red pixel includes color differences of 25 red pixels, as indicated by hatching in the drawing. Accordingly, the noise removing section 17 processes color differences of the 25 pixels through the ε-filter, thereby removing noise of the interest pixel. Also, in a similar manner, the noise removing section 17 performs noise removal by processing color differences of blue pixels. Further, in this case, the noise removing process may also be executed for the original green pixels Gr and Gb or for the original green pixels Gr and Gb and green pixel values Gx and Gy calculated in the simple demosaicing section 15.

A simple demosaicing section 18 performs an interpolation calculation process similarly as the simple demosaicing section 15, thereby to calculate green pixel values Gx and Gy in the spatial positions of red and blue pixels.

More specifically, as shown in FIG. 9, in the case where the interest pixel is the red pixel R2, the simple demosaicing section 18 averages the pixel values of green pixels Gb0, Gr2, Gr3, and Gb2 adjacent to the red pixel R2, and sets the average value to the green pixel value Gx in the spatial position of the interest pixel R2. Also, similarly, in the case of a blue pixel B, pixel values of adjacent green pixels are averaged, the average value is set to the green pixel value Gy in the spatial position of the blue pixel B.

An RB calculating section 19 calculates pixel value of red and blue pixels R and B by using the green pixel values Gx and Gy calculated in the simple mosaicing section 18. More specifically, the RB calculating section 19 adds the green pixel value Gx in the spatial position of the red pixel R, which pixel value has been calculated in the simple demosaicing section 18, to the color difference Cr2 of that pixel, thereby to calculate a pixel value of the red pixel R. Therefore, the pixel value R2 of the red pixel R2 shown in FIG. 9 is expressed as "Cr2+Gx2".

In addition, as shown in FIGS. 10 and 11, also for the blue pixel B1, a green pixel value Gy1 according to an average value of adjacent green pixels Gr1, Gb0, Gb1, and Gr3 is added to the color difference Cb1 of the blue pixel B1, thereby to calculate the pixel value of the blue pixel B1. Similar color difference calculations are executed for all the red and blue pixels R and B. Thereby, as shown in FIG. 12 by comparison to FIG. 9, raw data D2 in which green, red, and blue color signals are repeated in the sequential order corresponding to the Bayer array of the imaging device 3 is generated. Then, the optical correcting section 5 outputs the raw data D2 to the image processing section 6 and the interface 8. However, for example, in the event of executing the noise removing process only for the red and blue color differences, the operational configuration may be such that the processing reference pixel values Gx and Gy generated in the simple mosaicing section 15 are used in the process executed in the RB calculating section 19, and the process executed in the simple demosaicing section 18 is omitted.

In the image processing section 6, an edge-determining demosaicing section 20 performs a demosaicing process of the raw data D2, which has been output from this the optical correcting section 5. Thereby, the edge-determining demosaicing section 20 generates full color image data that includes red, green, and blue color data R, G, and B in the spatial positions of the respective pixels of the imaging device 3. In the process described above, the edge-determining demosaicing section 20 performs the interpolation calculation process of the pixel values of the pixels of interest by using pixel values in extensional direction of the edges, thereby regenerating the edges with high accuracy.

Figure 13:
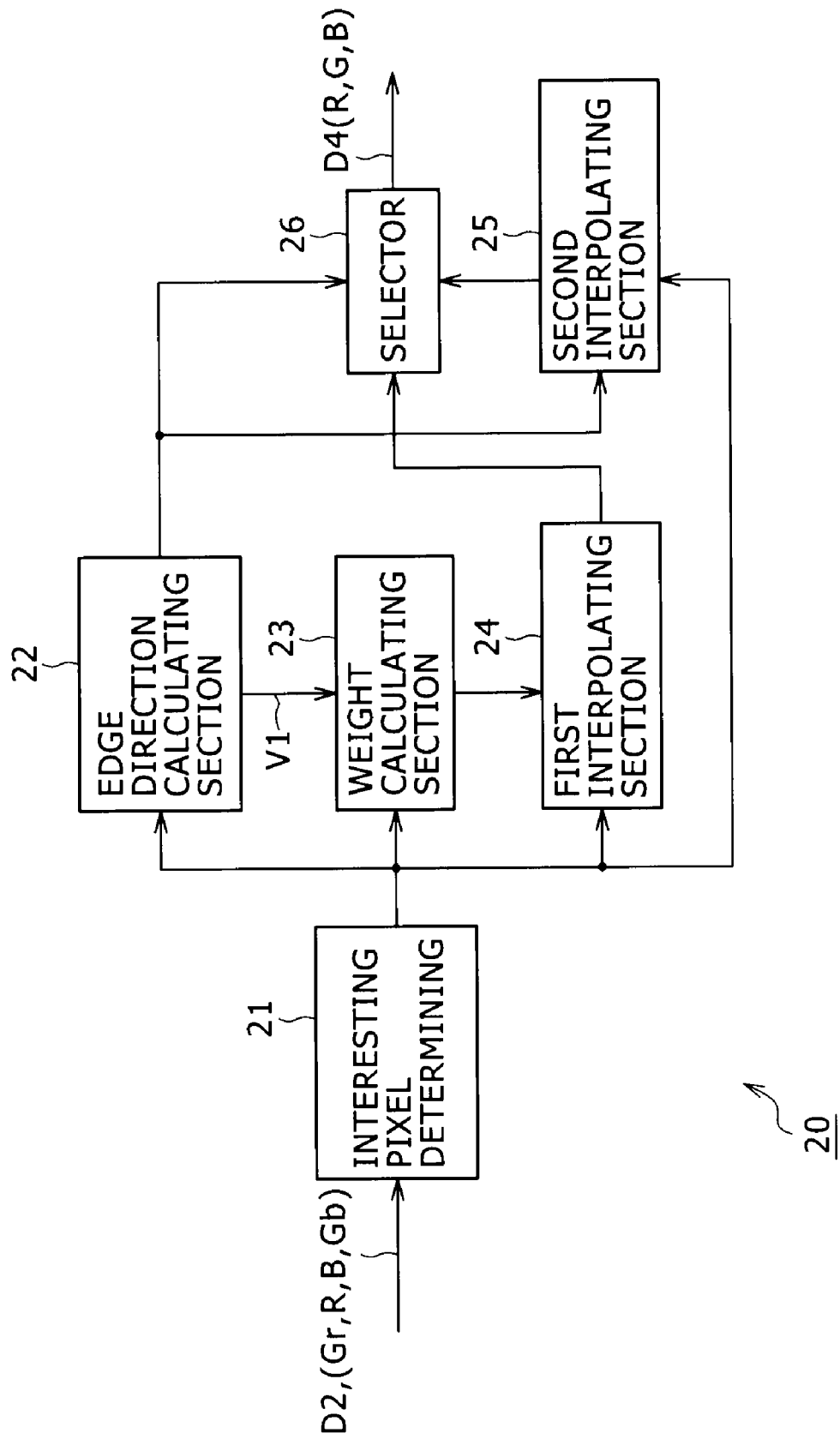
FIG. 13 is a block diagram showing an edge determination demosaicing section of the image processor section shown in FIG. 2.

More specifically, FIG. 13 is a block diagram showing the configuration of the edge-determining demosaicing section 20. The edge-determining demosaicing section 20 inputs into an interest pixel determining section 21, the raw data D2 output from the optical correcting section 5, and the interest pixel determining section 21 outputs pixel values of a local region about each interest pixel while serially changing the interest pixel. Here, in the present embodiment, the local region is set to a seven-by-seven pixel region about the interest pixel, for example.

An edge direction calculating section 22 calculates, for every local regions, an image slope in accordance with the pixel value output from the interest pixel determining section 21, and calculates an edge direction vector V1 indicative of the extensional direction of the edge. Further, the edge direction calculating section 22 detects an edge intensity from the magnitude of an image slope in a direction perpendicular to the direction determined in accordance with the edge direction vector V1, and outputs the result.

Figure 14:
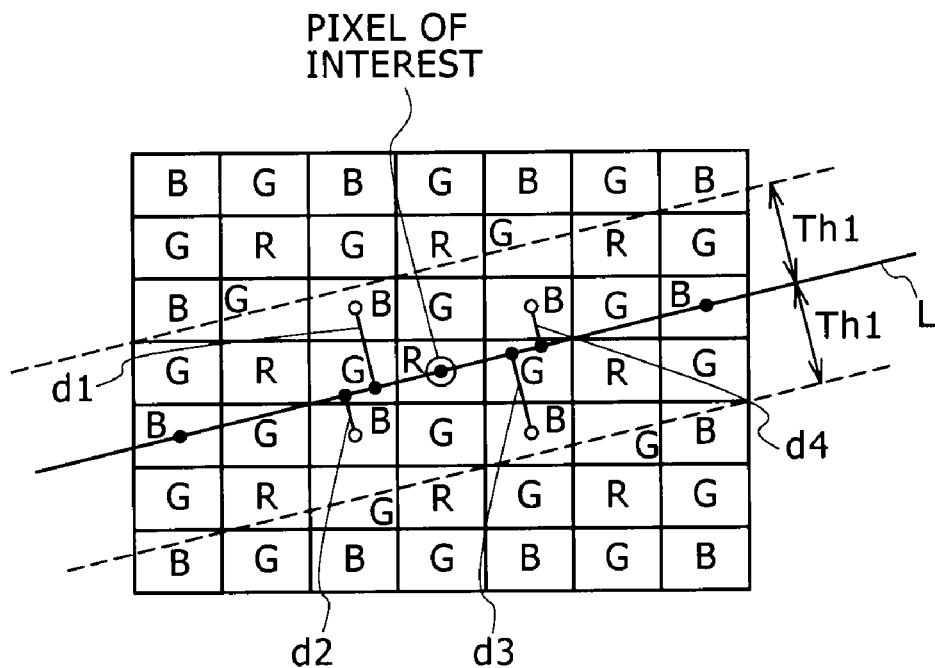
FIG. 14 is a plan view related to a description of a weight calculating section 23 of the edge determination demosaicing section shown in FIG. 13.

A weight calculating section 23 selects pixel values for use in the interpolation calculation process in accordance with the edge direction vector V1 calculated in the edge direction calculating section 22. The weight calculating section 23 further calculates weight factors of the respective pixel values. More specifically, as shown in FIG. 14, the weight calculating section 23 calculates each of pixel distances d1, d2, d3, d4, . . . along the direction determined in accordance with the edge direction vector V1 to a straight line L extending through the interest pixel.

Figure 15:
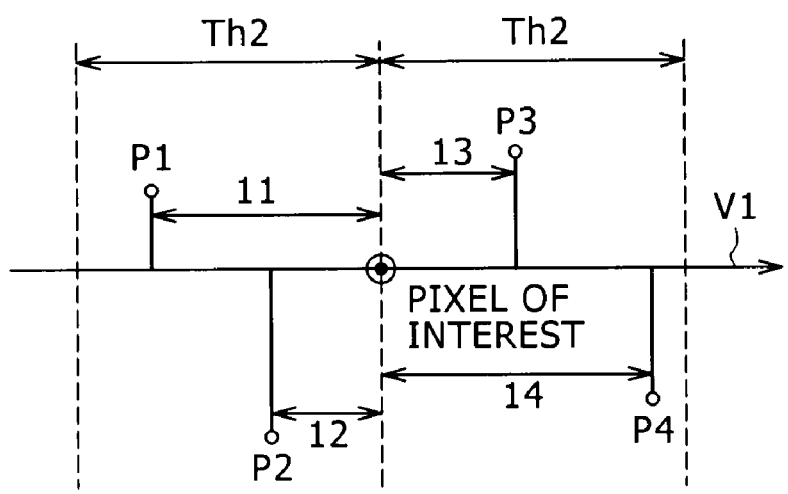
FIG. 15 is a plan view related to a description of continuation of FIG. 14.

Also, the weight calculating section 23 determines each of pixel distances d1, d2, d3, d4, . . . in accordance with a predetermined threshold value Th1, and selects pixels with the distances d1, d2, d3, d4, . . . shorter than or equal to the threshold value Th1 as pixels for use in the interpolation calculation process. Also, the weight calculating section 23 generates a first weight factor W1 that weights the respective selected pixels so that the values are higher as the distances d1, d2, d3, d4, . . . are shorter. Further, as shown in FIG. 15, the weight calculating section 23 calculates distances I1, I2, I3, I4, . . . of the respective selected pixels along the direction determined in accordance with the edge direction vector V1 from the interest pixel. Then, the weight calculating section 23 generates a second weight factor W2 that weights the respective selected pixels so that the values are higher as the distances I1, I2, I3, I4, . . . are shorter.

A first interpolating section 24 performs weighting addition operations of corresponding pixel values with the use of the respective first and second weight factors W1 and W2, thereby calculating respective pixel values of pixels of interest through the interpolation calculation process. Further, the first interpolating section 24 averages the results of the weighting addition operations using the first and second weight factors W1 and W2, and outputs the resultant average value.

A second interpolating section 25 determines the intensity of the edge obtained in the edge direction calculating section 22, in accordance with a predetermined threshold value. In the event that the intensity is lower than or equal to the predetermined value, the second interpolating section 25 calculates a pixel value of the interest pixel from pixel values in a predetermined range about the interest pixel without taking the edge direction into consideration, and the calculated pixel value is simply output.

A selector 26 outputs an average value output from the first interpolating section 24 as the pixel value of the interest pixel. Also, suppose that the edge intensity obtained in the edge direction calculating section 22 is determined in accordance with the predetermined threshold value, and the edge intensity is lower than or equal to the predetermined value. In this case, the selector 26 selects and outputs an output value of the second interpolating section 25 instead of the average value output from the first interpolating section 24.

A YCC converting section 28 (FIG. 2) performs calculation processes in accordance with Equations (1-1), (1-2), and (1-3) below.

$$Y = 0.29900 \times R + 0.58700 \times G + 0.11400 \times B \qquad (1\text{-}1)$$

$$Cb = 0.16874 \times R - 0.33126 \times G + 0.5000 \times B \qquad (1\text{-}2)$$

$$Cr = 0.50000 \times R - 0.41869 \times G - 0.08131 \times B \qquad (1\text{-}3)$$

Thereby, the YCC converting section 28 performs a calculation process of full-color image data D4 output from the edge-determining demosaicing section 20, converts the image data D4 to image data D5 of luminance signals and color difference signals, and outputs the image data D5.

Further, the YCC converting section 28 corrects the coefficients in Equations (1-1) to (1-3) and thereby executes, for example, a color adjustment process using a color conversion matrix. In addition, the YCC converting section 28 sets the gamma of the generated image data D5.

A YCC composing section 29 generates YCC image data D3 from the image data D5 output from the YCC converting section 28, and outputs the image data D3 to, for example, the encoder 7 and an external device.

(2) Operation of First Embodiment

In the digital still camera 1 (FIG. 1) configured as described above, an image capture signal of red-, blue-, and green pixel values serially and consecutively arranged in the sequential order corresponding to the Bayer array of the imaging device 3 is generated in the imaging device 3. Then, the image capture signal is digital-analog converted in the preprocessing section 4, whereby raw data D1 is generated. In the digital still camera 1, noise in this raw data D1 is depressed in the optical correcting section 5. Subsequently, in the following image processing section 6, raw data D2 is subjected to the demosaicing process thereby to generate full-color image data, and the full-color image data D3 is converted to image data D3 of luminance signals and color difference signals. Then, the image data D3 is compressed by the encoder 7 and is then recorded onto the recording medium 9. Also, when a user has specified raw data recording, the raw data D2 output from the optical correcting section 5 is recorded onto the recording medium 9.

The raw data D2 is processed in the demosaicing process (see FIG. 13) in the image processing section 6, in which pixels in the edge direction are selected. Then, the interpolation calculation process is executed with use of the pixel values of the selected pixels, thereby to generate the full-color image data D4. More specifically, in this case, for a green pixel, for example, an edge direction is detected in accordance with respective red and blue neighbor pixels, and red- and blue pixel values are obtained in accordance with the interpolation calculation process using pixels in the edge direction. Also, for a red pixel, an edge direction is detected in accordance with respective green and blue neighbor pixels, and green- and blue pixel values are obtained in accordance with the interpolation calculation process using pixels in the edge direction. Also, for a blue pixel, an edge direction is detected in accordance with respective red and green neighbor pixels, and red- and green pixel values are obtained in accordance with the interpolation calculation process using pixels in the edge direction.

As such, in the digital still camera 1, the target pixels for the interpolation calculation process are changed corresponding to the edge direction for every interest pixels, and are demosaiced. As a result, noise contaminated into the raw data D2 is intricately changed in characteristics and is contaminated into the full-color image data D4. Consequently, after the demosaicing process thus performed, color noise cannot easily be removed.

Further, in the case where noise is removed after the demosaicing process, noise cannot be removed when directly recording the raw data D2 onto the recording medium 9.

Further, in the case where noise is contaminated into the raw data D2, which is the processing target of the demosaicing process, the edge is erroneously detected, thereby resulting in that the edge is unnaturally emphasized in the full-color image data D4 after the demosaicing process. Further, color noise may rather increase to the extent of causing significant degradation of image quality.

As such, in the case where the image processing section 6 is configured as in the present embodiment, it is necessary to remove noise in the stage of the raw data before the demosaicing process is executed in the image processing section 6. However, when the noise removing process is simply executed for every color pixels, the luminance signals are affected, so that there is a risk that edge portions and the like are displayed in incorrect colors and hence image quality is significantly degraded.

In view of the above, the present embodiment is configured to operate as follows. In the optical correcting section 5 (FIG. 2), the raw data D1 is handled in the manner that an interest pixel is serially set by the peripheral pixel referencing section 12, and the pixel values of the interest pixel and the peripheral pixels are input into the simple demosaicing section 15 via the four-color separating section 13. In the simple demosaicing section 15, the raw data D1 is processed in the manner that a processing reference pixel value having a unified color signal component is calculated for every interest pixels. Also, in the subsequent color difference calculating section 16, the raw data D1 is converted into a pixel value for noise removal based on the processing reference pixel value. Then, the pixel value for noise removal is subjected to noise removal in the noise removing section 17. Thereafter, the pixel value is converted to the original pixel value.

Consequently, in the digital still camera 1, the color noise only can be removed without significantly affecting the luminance signal, as compared to the case where the color signal of each pixel is directly denoised. Hence, as compared to conventional cases, color noise contained in the raw data can be removed while effectively preventing image quality degradation.

Further, since the raw data is converted back to the source raw data after completion of noise removal, the noise removal effect can be further improved through combination with other noise removing process of raw data.

More specifically, according to the present embodiment, the Bayer array of the imaging device 3 is formed of repetitive two-by-two pixel blocks each configured of two green pixels Gr and Gb and red and blue pixels R and B. In the optical correcting section 5, the pixel values of the green pixels of the overall pixels are set to the processing reference pixel value, and the color differences of respective pixels of interest are obtained as pixel values for noise removal. Accordingly, for the pixel values of the green pixels, which are largest in number of pixels in the raw data D2, the noise removing process can be executed without obtaining color differences in any way. Consequently, in the case of the digital still camera 1, the processing reference pixel value is set to the green pixel values and the calculation of processing references is omitted for the green pixels, and hence the overall configuration is simplified.

(3) Effects/Advantages of First Embodiment

According to the configuration described above, a processing reference pixel value having a unified color signal component is generated from neighbor pixels of each interest pixel, the pixel value of the each interest pixel is converted into a pixel value for noise removal based on the processing reference pixel value, whereby noise thereof is removed. After the noise removal, each pixel value is converted back to the source pixel value. Thereby, color noise contained in the raw data can be removed while effectively preventing image quality degradation.

Further, among the red, green, and blue pixels composing the raw data, the pixel values of the green pixels are set to the processing reference pixel value, and color difference pixel values are generated in accordance with the differential values between the processing reference pixel value and the red- or green pixel values and are set to the pixel values for noise removal. Thereby, the process is omitted for the green pixels, and hence the configuration can be simplified.

Further, noise is removed from the pixel values of the green pixels composing the raw data or the pixel values of the green pixels and the generated processing reference pixel values, whereby noise can be even more reduced.

(4) Second Embodiment

In a second embodiment, the median value of neighbor green pixels is adapted for the green pixel values Gx and Gy, which respectively are used as the processing references. A digital still camera of the second embodiment has the same configuration as the digital still camera 1 of the first embodiment described above, except that the configuration related to the generation for the processing reference pixel values is different therefrom.

More specifically, according to the second embodiment, as shown in FIG. 3, for the red pixel R2, the simple demosaicing section 15 sorts the pixel values of the green pixels Gb0, Gr2, Gr3, and Gb2 adjacent to the red pixel R2 in order of low pixel values thereof, and then calculates an average value of the second and third pixel values in the sorted order. The simple demosaicing section 15 sets the average value as the median value to the pixel values of green pixels in the position of the red pixel R2. Also, similarly, for the blue pixel, the simple demosaicing section 15 sorts the pixel values of the adjacent pixels to obtain a median value, and sets the median value to the green pixel value. Further, in this process, a median value of pixels in a wider range may be adapted instead of the median value of four adjacent pixels.

Correspondingly to the process in the simple demosaicing section 15, the simple demosaicing section 18 calculates green pixel values in the positions of the red and blue pixels by executing a similar operation, thereby generating the source raw data.

As in the present embodiment, the median value of the neighbor green pixels is adapted when generating the green pixel values used as the processing references, effects/advantages similar to those of the first embodiment can be obtained.

(5) Third Embodiment

In a third embodiment, assuming that the spatial positions of red pixels and blue pixels corresponding to the red pixels are identical to one another, green pixel values in the spatial positions of red and blue pixels are calculated. Further, the present embodiment has the same configuration as the respective embodiments described above, except that the calculation method is different therefrom.

Figure 16A:
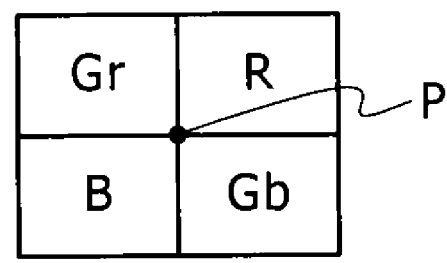
FIGS. 16(A) and 16(B), respectively, are plan views related to a description of processing of simple demosaicing sections 15, 18 of another embodiment of the present invention.
Figure 16B:
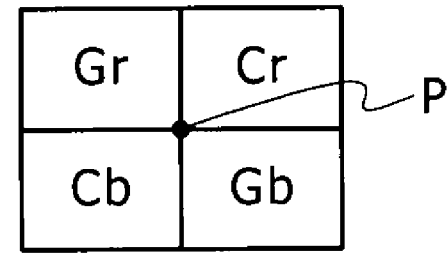

More specifically, it is assumed that the Bayer array of the imaging device 3 is formed from repetitive two-by-two pixel blocks, and the arrangement of the two-by-two pixel blocks is configured as shown in FIG. 16(A). It is further assumed that the spatial positions of the respective red and blue pixels R and B in FIG. 14 are at the central position of the two-by-two pixel block shown by a point P. In accordance with the assumption, as shown in FIGS. 16(A) and 16(B), the simple demosaicing sections 15 and 18 set an average value of green pixels Gr and Gb of the two-by-two pixel block to the green pixel values in the spatial positions of the red and blue pixels R and B.

Thus, according to the present embodiment, the green pixel values are calculated by assuming that the spatial positions of the red and blue pixels R and B are identical to one another. Thereby, calculation volume can be reduced, and hence effects/advantages similar to those of the embodiments described above can be obtained.

(6) Fourth Embodiment

In the embodiments described above, the pixel values for noise removal are, respectively, generated in the manner that the processing reference green pixel values Gx and Gy are subtracted from the red and blue pixel values R and B. Alternatively, however, in a fourth embodiment, the respective pixel values for noise removal are generated in accordance with the rate between the red and blue pixel values R and B that correspond to the green pixel values Gx and Gy. Further, a digital still camera of the present embodiment has the same configuration as the digital still camera 1 of the embodiment described above, except that the configuration related to the color differences is different therefrom.

More specifically, in the present embodiment, for the color difference Cr of the red pixel R, the color difference calculating section 16 performs the division of the pixel value R of the red pixel R by the processing reference pixel value Gx calculated in the position of the red pixel R. Then, the value R/Gx obtained from the division is set to the pixel value for noise removal of the red pixel value R. Also, similarly, for the blue pixel B, the color difference calculating section 16 performs the division of the pixel value B of the blue pixel B by the processing reference pixel value Gy calculated in the position of the blue pixel B. Then, the value B/Gy obtained from the division is set to the pixel value for noise removal of the blue pixel value B.

In addition, correspondingly to the color difference generation process, the RB calculating section 19 performs the multiplication of the color differences Cr, Cb with noise removed by the green pixel values Gx, Gy corresponding to thereto, thereby converting to the source pixel values R, B.

Thus, in the present embodiment, the pixel value for noise removal is generated in accordance with the rate between the processing reference pixel value and the red or green pixel value. Even in this case, effects/advantages similar to those of the first embodiment can be obtained.

(7) Fifth Embodiment

In a fifth embodiment, instead of the green pixel value, the luminance value is adapted to the processing reference pixel value. A digital still camera of the fifth embodiment has the same configuration as the digital still camera 1 of the embodiment described above, except that the configuration related to the processing reference pixel value is different therefrom.

According to the fifth embodiment, for the green pixel, the simple demosaicing section 15 calculates pixel values of the respective red and blue pixels in the spatial positions of the respective green pixels in accordance with the interpolation calculation process using the pixel values of the respective adjacent red and blue pixels. Further, in a similar manner, for the red pixel, the simple demosaicing section 15 calculates pixel values of the respective green and blue pixels in the spatial positions of the respective red pixels in accordance with the interpolation calculation process using the pixel values of the respective adjacent green and blue pixels. Further, in a similar manner, for the blue pixel, the simple demosaicing section 15 calculates pixel values of the respective red and green pixels in the spatial positions of the respective blue pixels in accordance with the interpolation calculation process using the pixel values of the respective adjacent red and green pixels.

In accordance with the calculation result, the demosaicing section 15 calculates the luminance value for every pixels. Further, alternatively, the luminance value calculation may be a simple calculation that is performed to obtain the luminance value by simply summing the red, green, and blue pixel values. Still alternatively, the luminance value calculation may be performed by executing the calculation process in accordance with Equation (1-1) to accurately calculate the luminance value of each pixel.

By using a pixel value Y of the processing reference, the color difference calculating section 16 calculates color difference pixel values (R−Y) and (B−Y) for every pixels. Further, in this case, the color difference pixel values may be calculated by use of Equations (1-2) and (1-3).

The noise removing section 17 executes the noise removing process of the respective color difference pixel values. The simple demosaicing section 18 and the RB calculating section 19 convert the respective color difference pixel values subjected to the noise removing process to the source pixel values of the mosaic image. Further, in this case, when the color differential pixel values have been calculated by use of Equations (1-2) and (1-3), the respective pixel values are calculated in accordance with following Equations.

$$R = Y + 1.402 \times Cr \qquad (2\text{-}1)$$

$$G = Y - 0.34414 \times Cb - 0.71414 \times Cr \qquad (2\text{-}2)$$

$$B = Y + 1.772 \times Cb \qquad (2\text{-}3)$$

Further, in the processes, calculation processing using Equation (1-1) may be omitted, and the respective color difference pixel values may be calculated by directly using Equations (1-2) and (1-3). Further, the series of the processes may be executed for the red and blue pixels without executing the process for the green pixel.

According to the present embodiment, even in the case where the color difference pixel value is obtained by setting the luminance value to the processing reference pixel value, effects/advantages similar to those of the embodiments described above can be obtained.

(8) Sixth Embodiment

In a digital still camera of a sixth embodiment, the simple demosaicing sections 15, 18 are configured by use of the second interpolating section 25 of the edge-determining demosaicing section 20.

As in the present embodiment, in the case where the simple demosaicing sections 15, 18 are configured by utilizing the configuration of the innate demosaicing process, the overall configuration can be simplified, thereby making it possible to obtain effects/advantages similar to those of the embodiments described above.

(9) Other Embodiments

While the respective embodiments have been described above with reference to the case where the color noise is removed by use of the ε-filter, the present invention is not limited thereby. According to the present embodiment, various other noise removal methods can be widely used in cases where the color noise is removed by use of a wavelet conversion process, where the color noise is removed by separating the frequency band into the high frequency component and the low frequency component, and where the noise is removed by use of a filter such as a bilateral filter or trilateral filter, for example.

Further, while the respective embodiments have been described above with reference to the case where the noise of the raw data is simply removed in the noise removing section 17, the present invention is not limited thereby. For example, the noise can be removed in combination with various other noise removal methods.

Further, while the respective embodiments have been described above with reference to the case where the present invention is adapted to the digital still camera, the present invention is not limited thereby. The present invention can be widely adapted to video cameras that capture motion images, and various other image processing apparatuses and programs that process raw data. Further, an image processing program such as mentioned above may be provided by being preliminarily installed into, for example, a computer or image processing apparatus. Alternatively, the program may be provided by being preliminarily recorded onto any one of various recording media, such as an optical disk, magnetic disc, and memory card. Still alternatively, the programs may be provided through downloading via networks, such as the Internet.

INDUSTRIAL APPLICABILITY

The present invention can be adapted to digital still cameras, for example.

The invention claimed is:
1. An image capture apparatus, comprising:
an image capture section that outputs raw data;
a converting section that serially sets each interest pixel onto a mosaic image formed of the raw data and that converts a pixel value of an interest pixel into a pixel value for noise removal based on a processing reference pixel value having a unified color signal component in each interest pixel;
a noise removing section that removes noise from the pixel value for noise removal;

a reversely converting section that converts the pixel value for noise removal with noise removed in the noise removing section into a source pixel value by executing an inverse process relative to the process performed in the converting section; and a demosaicing section that generates full color image data by executing a demosaicing process of a mosaic image formed from the image values processed in the reversely converting section, wherein the pixel value for the noise removal is a differential value between the processing reference pixel value and the pixel value of the interest pixel, or a pixel value represented by a ratio of the processing reference pixel value to the pixel value of the interest pixel.

2. An image capture apparatus as claimed in claim 1, wherein the pixels of the mosaic image formed of the raw data are red, green, and blue pixels, the processing reference pixel value is a pixel value of a green pixel in a spatial position of the red, and blue pixels, and the interest pixel is any one of the pixel values of the red and blue pixels.

3. An image capture apparatus as claimed in claim 2, wherein the noise removing section further removes noise either from the pixel value of the green pixel of the mosaic image or from the pixel value of the green pixel of the mosaic image and the pixel values of the green pixels in the spatial positions of the red and blue pixels.

4. An image capture apparatus as claimed in claim 2, wherein the processing reference pixel value is a median value of the pixel values of the green pixels in a neighborhood of the red and blue pixels.

5. An image capture apparatus as claimed in claim 2, wherein the mosaic image formed of the raw data is formed of iterative blocks each having an identical pixel arrangement, and the processing reference pixel value is generated on an assumption that spatial positions of red and blue pixels in one block are identical.

6. An image capture apparatus as claimed in claim 1, wherein the mosaic image formed of the raw data is formed of red, green, and blue pixels, the processing reference pixel value is a pixel value of a green pixel in a spatial position of the red and blue pixels, and the interest pixel is any one of the pixel values of the red or blue pixels.

7. An image capture apparatus as claimed in claim 1, wherein the pixels of the mosaic image formed of the raw data are red, green, and blue pixels, the processing reference pixel value is a luminance value in a spatial position of each pixel, and the pixel value for noise removal is a color difference pixel value.

8. An image processing apparatus that suppresses noise of raw data serially acquired in a pixel array of an imaging device, the apparatus comprising:

a converting section that serially sets each interest pixel onto a mosaic image formed of the raw data and that converts a pixel value of an interest pixel into a pixel value for noise removal based on a processing reference pixel value having a unified color signal component in each interest pixel;

a noise removing section that removes noise from the pixel value for noise removal; and a reversely converting section that converts the pixel value for noise removal with noise removed in the noise removing section into a source pixel value by executing an inverse process relative to the process performed in the converting section, wherein the pixel value for the noise removal is a differential value between the processing reference pixel value and the pixel value of the interest pixel, or a pixel value represented by a ratio of the processing reference pixel value to the pixel value of the interest pixel.

9. An image processing method, implemented by an image processing apparatus, that suppresses noise of raw data serially acquired in a pixel array of an imaging device, the method comprising:

serially setting each interest pixel onto a mosaic image formed of the raw data;

converting a pixel value of an interest pixel into a pixel value for noise removal based on a processing reference pixel value having a unified color signal component in the interest pixel;

removing noise from the pixel value for noise removal; and reversely converting, via a processor, the pixel value for noise removal with noise removed in the noise removing into a respective source pixel value by executing an inverse process relative to the process performed in the converting, wherein the pixel value for the noise removal is a differential value between the processing reference pixel value and the pixel value of the interest pixel, or a pixel value represented by a ratio of the processing reference pixel value to the pixel value of the interest pixel.

10. A non-transitory computer-readable medium storing computer readable instructions thereon that when executed by a computer cause the computer to perform a method that suppresses noise of raw data serially acquired in a pixel array of an imaging device, the method comprising:

serially setting each interest pixel onto a mosaic image formed of the raw data;

converting a pixel value of an interest pixel into a pixel value for noise removal based on a processing reference pixel value having a unified color signal component in each interest pixel;

removing noise from the pixel value for noise removal; and reversely converting the pixel value for noise removal with noise removed in the noise removing into a source pixel value by executing an inverse process relative to the process performed in the converting, wherein the pixel value for the noise removal is a differential value between the processing reference pixel value and the pixel value of the interest pixel, or a pixel value represented by a ratio of the processing reference pixel value to the pixel value of the interest pixel.

11. An image capturing apparatus comprising:

an image capture section that outputs raw data including a first pixel having a first color component and a second pixel having a second color component;

a first conversion section that converts said second pixel into a pixel for noise removal based on a processing reference pixel generated based on the first pixel, wherein a spatial position of said processing reference pixel corresponds to said second pixel;

a noise removing section that removes noise from the pixel for noise removal;

a second conversion section that converts the pixel for noise removal from said noise removing section into a pixel having said second color component; and a full color image generating section that generates full color image data based on a pixel from the full color image generating section and the first pixel, wherein the pixel for the noise removal is a differential value between the processing reference pixel and the second pixel, or a pixel value represented by a ratio of the processing reference pixel to the second pixel.

12. The image capturing apparatus according to claim 11, wherein the noise removal pixel is a pixel representing a color difference.

13. The image capturing apparatus according to claim 11, wherein the first color component is green and the second color component is one of red or blue.

14. An image processing apparatus for reducing noise from raw data including a first pixel having a first color component and a second pixel having a second color component, comprising:

a first conversion section that converts said second pixel into a pixel for noise removal based on a processing reference pixel generated based on the first pixel, wherein a spatial position of said processing reference pixel corresponds to said second pixel;

a noise removing section that removes noise from the pixel for noise removal;

a second conversion section that converts the pixel for noise removal from said noise removing section into a pixel having said second color component; and a full color image generating section that generates full color image data based on a pixel from the full color image generating section and the first pixel, wherein the pixel for the noise removal is a differential value between the processing reference pixel and the second pixel, or a pixel value represented by a ratio of the processing reference pixel to the second pixel.

15. The image processing apparatus according to claim 14, wherein the noise removal pixel is a pixel representing a color difference.

16. The image processing apparatus according to claim 14, wherein the first color component is green and the second color component is one of red or blue.

* * * * *